(12) United States Patent
Soares et al.

(10) Patent No.: US 10,628,282 B2
(45) Date of Patent: Apr. 21, 2020

(54) GENERATING SEMANTIC FLOW GRAPHS REPRESENTING COMPUTER PROGRAMS

(71) Applicant: INTERNATIONAL BUSINESS MACHINES CORPORATION, Armonk, NY (US)

(72) Inventors: Ioana Monica Baldini Soares, Irvington, NY (US); Aleksandra Mojsilovic, New York, NY (US); Evan Patterson, Austin, TX (US); Kush Raj Varshney, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 16/021,080

(22) Filed: Jun. 28, 2018

(65) Prior Publication Data

US 2020/0004659 A1 Jan. 2, 2020

(51) Int. Cl.
| | | |
|---|---|---|
| *G06F 9/44* | (2018.01) | |
| *G06F 11/36* | (2006.01) | |
| *G06F 8/41* | (2018.01) | |
| *G06F 11/34* | (2006.01) | |
| *G06F 11/30* | (2006.01) | |

(52) U.S. Cl.
CPC .......... *G06F 11/3608* (2013.01); *G06F 8/433* (2013.01); *G06F 11/302* (2013.01); *G06F 11/3447* (2013.01)

(58) Field of Classification Search
None
See application file for complete search history.

(56) References Cited

U.S. PATENT DOCUMENTS

| | | | |
|---|---|---|---|
| 8,666,999 B2 | 3/2014 | Havel et al. | |
| 8,676,853 B2 | 3/2014 | Kasravi et al. | |
| 9,804,838 B2 | 10/2017 | Grechanik | |
| 10,073,763 B1* | 9/2018 | Raman | G06F 11/3688 |
| 2003/0172368 A1* | 9/2003 | Alumbaugh | G06F 8/71 |
| | | | 717/106 |
| 2004/0154000 A1 | 8/2004 | Kasravi et al. | |
| 2004/0154009 A1* | 8/2004 | Reynaud | G06F 8/51 |
| | | | 717/155 |
| 2005/0278714 A1* | 12/2005 | Vahid | G06F 8/443 |
| | | | 717/159 |
| 2006/0064680 A1* | 3/2006 | Devane | G06F 8/41 |
| | | | 717/140 |

(Continued)

OTHER PUBLICATIONS

Alrabaee et al., "BinGold: Towards Robust Binary Analysis by Extracting the Semantics of Binary Code as Semantic Glow Graphs (SFGs)," DFRWS USA 2016, Proceeding of the 16th Annual USA Digital Forensics Research Conference, Digital Investigation 18, 2016, pp. 1-12.

(Continued)

*Primary Examiner* — Insun Kang
(74) *Attorney, Agent, or Firm* — Cantor Colburn LLP; Anthony Curro (57) ABSTRACT

A computer-implemented method includes generating a raw flow graph based on execution of a program. A semantic flow graph is generated based on the raw flow graph and based on an ontology in a subject matter-domain associated with the program. The semantic flow graph illustrates one or more semantic concepts of the program.

17 Claims, 8 Drawing Sheets

(56) References Cited

U.S. PATENT DOCUMENTS

| | | | | |
|---|---|---|---|---|
| 2006/0218543 | A1* | 9/2006 | Boger | G06F 11/3612 717/157 |
| 2009/0113394 | A1* | 4/2009 | Weber | G06F 8/10 717/126 |
| 2009/0133006 | A1* | 5/2009 | Cheung | G06F 8/71 717/144 |
| 2009/0158249 | A1* | 6/2009 | Tomkins | G06F 11/3696 717/107 |
| 2009/0234640 | A1* | 9/2009 | Boegl | G06F 8/10 704/9 |
| 2009/0319981 | A1* | 12/2009 | Akkiraju | G06F 8/10 717/104 |
| 2010/0023921 | A1* | 1/2010 | Chaar | G06F 8/20 717/102 |
| 2010/0031232 | A1* | 2/2010 | Glazier | G06F 8/10 717/106 |
| 2010/0031240 | A1* | 2/2010 | Drumm | G06F 16/951 717/143 |
| 2010/0083215 | A1* | 4/2010 | Bogl | G06F 8/10 717/105 |
| 2010/0088686 | A1* | 4/2010 | Langworthy | G06F 8/41 717/143 |
| 2011/0154236 | A1* | 6/2011 | Stoeck | G06F 3/048 715/771 |
| 2012/0062574 | A1* | 3/2012 | Dhoolia | G06K 9/00476 345/506 |
| 2012/0066661 | A1* | 3/2012 | Balani | G06F 8/20 717/104 |
| 2012/0066662 | A1* | 3/2012 | Chao | G06F 8/10 717/104 |
| 2012/0102456 | A1* | 4/2012 | Paulheim | G06F 8/73 717/116 |
| 2012/0197832 | A1* | 8/2012 | Shanmukh | G06F 8/10 706/46 |
| 2012/0278788 | A1* | 11/2012 | Crapo | G06F 8/51 717/106 |
| 2013/0086578 | A1* | 4/2013 | Eilam | G06F 9/45558 718/1 |
| 2013/0254736 | A1* | 9/2013 | Chen | G06Q 10/067 717/101 |
| 2013/0254739 | A1* | 9/2013 | Chen | G06F 8/70 717/102 |
| 2014/0258980 | A1* | 9/2014 | Bagheri | G06F 8/60 717/120 |
| 2014/0280370 | A1* | 9/2014 | Oberle | G06F 8/51 707/803 |
| 2015/0363294 | A1 | 12/2015 | Carback et al. | |
| 2016/0041847 | A1* | 2/2016 | Fang | G06F 9/52 718/103 |
| 2016/0154631 | A1* | 6/2016 | Cruse | G06F 8/315 717/104 |
| 2016/0162518 | A1* | 6/2016 | King | H04L 67/42 717/113 |
| 2016/0170714 | A1* | 6/2016 | Siu | G06F 8/20 717/105 |
| 2016/0170859 | A1* | 6/2016 | Bucuvalas | G06F 8/433 717/132 |
| 2016/0283610 | A1* | 9/2016 | Simitsis | G06F 8/433 |
| 2016/0350364 | A1* | 12/2016 | Anicic | G06F 17/2785 |
| 2018/0039522 | A1* | 2/2018 | Fang | G06F 9/52 |
| 2018/0067732 | A1* | 3/2018 | Seetharaman | G06F 3/0482 |
| 2018/0067846 | A1* | 3/2018 | Chappalgaon | G06F 8/76 |
| 2018/0165135 | A1* | 6/2018 | Bahrami | G06F 9/541 |
| 2018/0373507 | A1* | 12/2018 | Mizrahi | G06N 7/00 |
| 2019/0012577 | A1* | 1/2019 | Lahr | G06F 9/5038 |
| 2019/0073356 | A1* | 3/2019 | Crapo | G06N 5/022 |
| 2019/0138333 | A1* | 5/2019 | Deutsch | G06F 9/45516 |
| 2019/0138970 | A1* | 5/2019 | Deutsch | G06F 9/542 |

OTHER PUBLICATIONS

Alrabaee et al., "SIGMA: A Semantic Integrated Graph Matching Approach for Identifying Reused Functions in Binary Code," DFRWS 2015 Europe, Digital Investigation 12 , 2015, pp. 1-11.Alrabaee.

Wills, "Automated Program Recognition by Graph Parsing," Technical Report 1358, AD-A259609, MIT Artificial Intelligence Laboratory, Jul. 1992, 1-337.

Yao et al., "Towards a Semantic-Based Approach for Software Reusable Component Classification and Retrieval," ACMSE '04, ACM, Apr. 2004, pp. 110-115.

\* cited by examiner

```
import pandas as pd
from sklearn.cluster import KMeans iris = pd.read_csv("iris.csv")
iris = iris.drop('Species', 1)

kmeans = KMeans(n_clusters=3)
kmeans.fit(iris.values)
centroids = kmeans.cluster_centers_
clusters = kmeans.labels_
```

GENERATING SEMANTIC FLOW GRAPHS REPRESENTING COMPUTER PROGRAMS

BACKGROUND

The present invention relates to computer programming and, more specifically, to generating semantic flow graphs representing computer programs.

In computing, a program is a specific set of ordered operations for a computer to perform. In the modern computer that John von Neumann outlined in 1945, the program contains a sequence of instructions that the computer follows. Typically, the program is put into a storage area accessible to the computer. The storage area or memory can also contain data on which the instructions operate. A computer program includes source code, which is usually written by a computer programmer in a programming language. From the source code, a compiler can derive machine code, which consists of instructions that the computer can directly execute.

SUMMARY

Embodiments of the present invention are directed to a computer-implemented method for generating a semantic flow graph. A non-limiting example of the computer-implemented method includes generating, using a processor, a raw flow graph based on execution of a program. A semantic flow graph is generated based on the raw flow graph and based on an ontology in a subject matter-domain associated with the program. The semantic flow graph illustrates one or more semantic concepts of the program.

Embodiments of the present invention are directed to a system for generating a semantic flow graph. A non-limiting example of the system includes a memory having computer-readable instructions and one or more processors for executing the computer-readable instructions. The computer-readable instructions cause the one or more processors to generate a raw flow graph based on execution of a program. The computer-readable instructions further cause the one or more processors to generate a semantic flow graph based on the raw flow graph and based on an ontology in a subject matter-domain associated with the program. The semantic flow graph illustrates one or more semantic concepts of the program.

Embodiments of the invention are directed to a computer-program product for generating a semantic flow graph, the computer-program product including a computer-readable storage medium having program instructions embodied therewith. The program instructions are executable by a processor to cause the processor to perform a method. A non-limiting example of the method includes generating a raw flow graph based on execution of a program. Further according to the method, a semantic flow graph is generated based on the raw flow graph and based on an ontology in a subject matter-domain associated with the program. The semantic flow graph illustrates one or more semantic concepts of the program.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, computers are becoming more and more common as they are integrated into numerous devices. Although computers continuously execute programs, they do not understand the programs they run. For example, a computer is unable to analyze its program tasks and output a description (e.g., in written text using natural language) of the program tasks it performs to those using, developing, or updating a program. Programmers and users receive no automated computer assistance when writing programs, using them, or understanding them. Thus, as more programs are being written and used, much of the work involved in writing, maintaining, and explaining them is performed manually.

Turning now to an overview of the aspects of the invention, one or more embodiments of the invention address the above-described shortcomings of the prior art by providing an artificially intelligent mechanism for forming semantic representations of computer programs in a known subject-matter domain. Embodiments of the invention utilize artificial intelligence to provide programmers and others working with computer code with computer assistance in understanding that computer code. Utilizing aspects of the invention, machines can learn to understand code, and artificially intelligent agents of the machine can empower human knowledge workers or generate useful programs of their own. According to some embodiments of the invention, an enrichment system for this purpose is fully automated. The enrichment system receives a program and, optionally, a subject-matter domain selection, and the enrichment system need not receive any other input from a user. The enrichment system may synthesize algorithmic techniques from computer program analysis and knowledge representation, as well as mathematical ideas from category theory and programming language theory. Embodiments of the enrichment system may be particularly useful in the field of data science, bioinformatics, natural language processing, or other scientific subject-matter domains with a heavy computational focus.

More specifically, an enrichment system in accordance with aspects of the invention may generate a raw flow graph based on execution of the program. The enrichment system may access an ontology in the subject-matter domain of the program to expand parts of the raw flow graph with their semantic equivalents. Additionally, parts of the raw flow graph without known semantic equivalents may be collapsed into smaller parts, representing unknown functions. The result may be a semantic flow graph that describes the program.

The above-described aspects of the invention address the shortcomings of the prior art by enabling a computer to associate semantic descriptions to code. With an enrichment system according to some embodiments of the invention, a computer may behave as if it truly understands a program. For instance, with reference to a resulting semantic flow graph, the computer may make suggestions for improvement or may assist in generating comments or metadata associated with program code. In short, the enrichment system is an intelligent tool that programmers and other users can use to assist them in building and utilizing programs.

Figure 1:
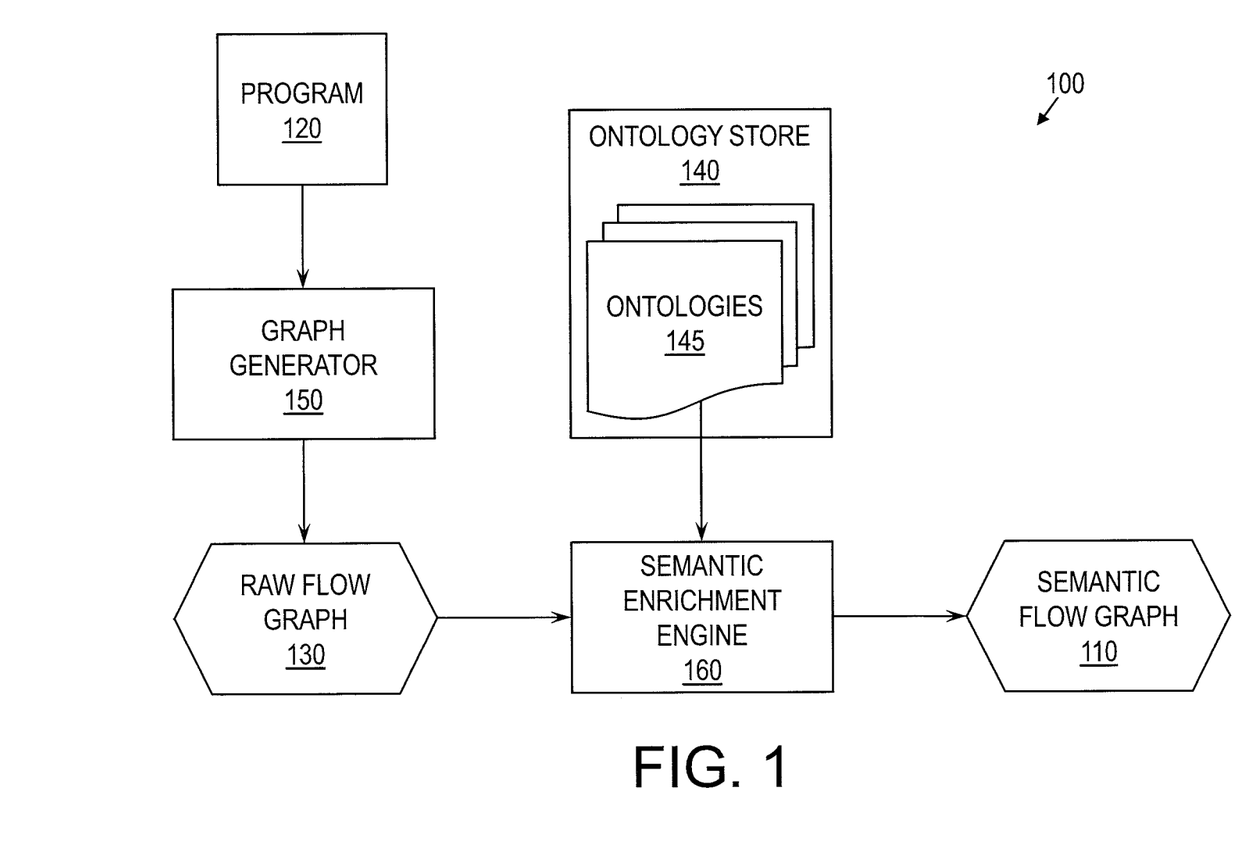
FIG. 1 is a block diagram of an enrichment system for generating a semantic flow graph from a program according to some embodiments of the invention.

Turning now to a more detailed description of aspects of the present invention, FIG. 1 is a block diagram of an enrichment system 100, or semantic enrichment system, according to some embodiments of the invention. The enrichment system 100 may generate a semantic flow graph 110 to represent a program 120. To this end, generally, the enrichment system 100 may generate a raw flow graph 130 of the program 120, and may convert that raw flow graph 130 to a final semantic flow graph 110 through a process of semantic enrichment executed by the semantic enrichment engine 160. In some embodiments of the invention, the semantic enrichment engine 160 also utilizes an ontology 145 from an ontology store 140. An ontology 145 is a formal naming and defining of entities, such as types and functions, along with their relationships. In other words, an ontology 145 describes entities and their relationships within a particular subject-matter domain, or field.

As shown in FIG. 1, the enrichment system 100 may include a graph generator 150, the ontology store 140, and a semantic enrichment engine 160. Generally, the graph generator 150 may generate the raw flow graph 130 representing the program 120. Raw flow graphs 130 are well known in the art to represent programs 120, and thus the graph generator 150 may utilize a known mechanism for generating the raw flow graph 130. The semantic enrichment engine 160 may utilize an appropriate ontology 145 in the ontology store 140 to convert the raw flow graph into a semantic flow graph 110 through a process of semantic enrichment. The ontology store 140 may maintain one or more ontologies 145 as will be described further below. The ontology store 140 may be, for example, a database or one or more files used to maintain one or more established ontologies 145. Each of the graph generator 150 and the semantic enrichment engine 160 may include software, hardware, or a combination of both. For instance, each of the graph generator 150 and the semantic enrichment engine 160 may be one or more software modules or one or more specialized hardware circuits, or a combination thereof.

Both a raw flow graph 130 and semantic flow graph 110 may capture the execution of a program 120, but these two graphs do so at different levels of abstraction. The raw flow graph 130 may record concrete function calls made by the program 120, and the raw flow graph 130 may be language- and library-dependent. In contrast, in some embodiments of the invention, the semantic flow graph 110 describes the program 120 in terms of abstract concepts belonging to a formal ontology 145. The semantic flow graph 110 may be language- and library-independent.

The process of semantic enrichment, which may be performed by the semantic enrichment engine 160, may transform the raw flow graph 130 into the semantic flow graph 110, which describes the program 120 in semantic terms. Semantic enrichment may utilize an ontology 145 applicable to a specific subject-matter domain, such as the field of data science, for example. Although references are made herein to data science as the subject-matter domain of an example program 120 and an example ontology 145, it will be understood that a program 120 may belong to another subject-matter domain, in which case an appropriate corresponding ontology 145 may be used.

According to some embodiments of the invention, an ontology 145 includes two kinds of entities: concepts and annotations. In the subject-matter domain of data science, for instance, concepts formalize the abstract concepts of machine learning, statistics, and data computing. A semantic flow graph 110 may have nodes and edges linked to concepts, and as such, the semantic flow graph 110 has semantics. Further, according to some embodiments of the invention, annotations of an ontology 145 map functions in software packages of the subject-matter domain onto the concepts of the ontology 145. More specifically, for a data-science ontology, annotations may map functions in the pandas software package or the scikit-learn software package to concepts. During semantic enrichment, as will be described further below, annotations of the ontology 145 may translate concrete functions in the raw flow graph 130 into abstract functions in the semantic flow graph 110.

The ontology store 140 may maintain one or more ontologies 145, each of which may be specific to a subject-matter domain and may map functions of software packages in that subject-matter domain to concepts. Further, each ontology 145 may be defined according to an ontological language described herein. Generally, an ontology 145 is a formal naming and definition of the types, properties, and interrelationships of entities that exist in a subject-matter domain, or domain of discourse. In contrast, an ontology language is a formal language used to define an ontology 145. Some embodiments of the invention utilize a novel ontology language, described herein, to define an ontology 145. Ontologies 145 stored in the ontology store 140 may be defined according to this ontology language.

According to some embodiments of the invention, the new ontology language in which ontologies 145 are represented is the Monoidal Ontology and Computing Language (Monocl), which will be described in more detail below. It will be understood that Monocl is an example ontology language useable by some embodiments of the invention, and that other ontology languages may be used, particularly ontology languages sharing the properties of Monocl described herein. Existing ontology languages make it difficult to express procedural or algorithmic knowledge, which may be needed to semantically describe program code. For instance, the Web Ontology Language (OWL), the leading standard for knowledge representation, is a description logic designed to express taxonomy (i.e., is-a relations), meronomy (i.e., part-whole relations), and other forms of hierarchical declarative knowledge. The same is true of existing ontologies about data science, such as Predictive Model Markup Language (PMML), Statistics Ontology (STATO), and Machine Learning (ML) Schema.

Lambda calculus is a classic model of a computational process, as might be performed by a computer program. According to some embodiments of the invention, Monocl is closer to lambda calculus than to a description logic. Due to the close connection between category theory and type theory, exemplified in the correspondence between cartesian closed categories and simply typed lambda theories, Monocl may take advantage of the syntactically and semantically flexible world of algebra but still utilize the highly developed theory of programming languages. From category theory, Monocl adopts the following, among other things, in some embodiments of the invention: a point-free textual syntax, unencumbered by the subtleties of variable binding; an intuitive yet fully precise graphical syntax; and a flexible denotational semantics. From programming language theory, Monocl may adopt notions of subtyping and ad hoc polymorphism. The ontology language can be considered a minimalistic, typed, functional programming language. However, Monocl differs from real-world programming languages, as it is designed for knowledge representation rather than actual computing.

According to some embodiments of the invention, Monocl is written in the textual syntax of monoidal category theory or, equivalently, in a graphical syntax of interconnected boxes and wires. The concept of graphical languages based on string diagrams is based on category theory. The textual and graphical syntaxes are parallel, although not isomorphic, and only the graphical syntax is described in detail herein. One of skill in the art will understand how to translate the graphical syntax into a textual syntax, as needed. For example, and not by way of limitation, the textual syntax may include one or more tables or text organized in some other manner. Further, one of skill in the art will understand how to utilize this ontology language and its syntax, and to store an ontology 145 according to this ontology language in the ontology store 140. For instance, concepts and annotations of each ontology 145 may be written in graphical syntax or textual syntax and stored in the ontology store 140.

In some embodiments of the invention, each expression in Monocl is either a type or a function. This terminology agrees with the terminology of functional programming. A type represents a kind or species of thing in a subject-matter domain, such as data science. A function is a functional relation or mapping from an input type (i.e., a domain) to an output type (i.e., a codomain). A role of the ontology language may be to say how new types and functions can be constructed from existing types and functions.

In some embodiments of the invention, types are represented graphically by wires when represented in the graphical syntax. For instance, a basic type X is drawn as a single wire labeled X. The product of two types X and Y may be another type X×Y, which has the usual meaning: an element of type X×Y is an element of type X and an element of type Y, in that order. Products of three or more types are defined analogously. Diagrammatically, a product of n types may be represented as a bundle of n wires in parallel. Product types are similar to record or data structure types in real-world programming languages, such as struct types in the C programming language. In some embodiments of the invention, there also exists a unit type, 1, inhabited by a single element. This is analogous to the void type in C and Java, the NoneType type in Python, whose sole inhabitant is None, and the NULL type in R. Diagrammatically, the unit type may be represented as an empty bundle of wires (i.e., a blank space).

A function may be represented graphically by way of a wiring diagram. A wiring diagram, also referred to as a string diagram, defines a function by connecting boxes with wires according to certain rules. For instance, a basic function f with domain X and codomain Y, written as f: X→Y, is drawn as a box labeled f. The top of the box has an input port with an incoming wire X, and the bottom has an output port with an outgoing wire Y.

Figure 2A:
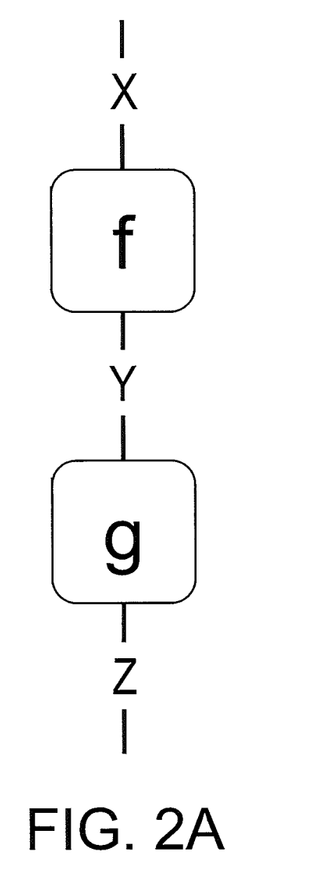
FIG. 2A illustrates a graphical syntax for representing a composition of abstract functions in an ontology according to some embodiments of the invention.
Figure 2B:
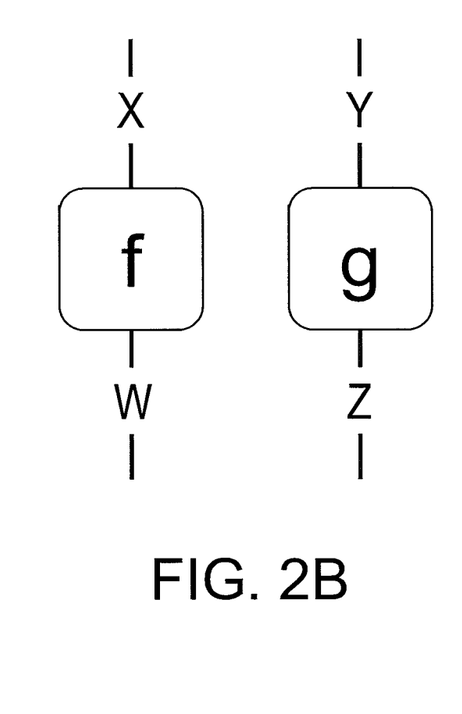
FIG. 2B illustrates a graphical syntax for representing a product of abstract functions in an ontology according to some embodiments of the invention.

The rules for connecting boxes within a wiring diagram may correspond to ways of creating new functions from old, such as by products and compositions of functions. The composition of a function f: X→Y with g: Y'→Z is a new function f·g: X→Z. Algorithmically speaking, f·g computes in sequence: f and then g. In some embodiments of the invention, for this composition to be valid, the intermediate types Y and Y' are compatible, such that Y is a subtype of Y'. The product of functions f: X→W and g: Y→Z is another function f×g: X×Y→W×Z. Algorithmically, f×g computes f and g in parallel, taking the inputs of both f and g, and returning the outputs of both as well. For example, FIG. 2A illustrates this graphical syntax for the composition of functions f and g, while FIG. 2B illustrates the graphical syntax for the product of functions f and g, according to some embodiments of the invention. One of skill in the art will understand how to describe other constructions of functions, such as identities, duplications, and deletions.

In some embodiments of the invention, Monocl allows a type to be declared a subtype of one or more other types, which establishes an "is-a" relation between types. For instance, matrices can be a subtype of both arrays and data tables, because matrices are arrays of rank 2 and because matrices can be viewed as tables whose columns have a common data type. In some embodiments of the invention, subtyping in Monocl differs from inheritance in a typical object-oriented programming language. Subtyping in Monocl can be viewed as implicit conversion, also known as coercion. For instance, if a type X is a subtype of X', then there is a canonical way to convert elements of type X into elements of type X'. A matrix is an array, and thus a matrix can be trivially converted into an array, because a matrix is already an array of rank 2. Although a matrix is not strictly speaking a data table, a matrix can be converted into a data table by simply assigning numerical names to the columns.

In addition to serving as the "is-a" relation ubiquitous in knowledge representation systems, subtypes may enable ad hoc polymorphism. Operationally, to compose a function f: X→Y with g: Y'→Z, f may be computed, the result may be coerced from type Y to Y', and then g may be computed. In some embodiments of the invention, diagrammatically, a wire has valid types if and only if the source port's type is a subtype of the target port's type. Thus, implicit conversions are likewise implicit in the graphical syntax.

In some embodiments of the invention, Monocl supports "is-a" relations between functions, which are referred to herein as sub-function relations, in analogy to subtypes. For instance, a function f for reading a table from a tabular file is a sub-function of a function f for reading generic data from a generic data source. In this example, the domain off is a tabular file, which is a subtype of a generic data source, which is the domain off. The codomain of function f is a table, which is a subtype of generic data, which is the codomain off. Consider two computational paths that accept a tabular file and return generic data. In that case, the function f could be applied, and then the resulting table could be coerced to generic data. Alternatively, the tabular file could be coerced to a generic data source, and then f could be applied. In some embodiments of the invention, the sub-function relation asserts that these two computations are equivalent. In category-theoretic jargon, a sub-function can be viewed as a natural transformation between two functions whose components are implicit conversions.

The ontology store 140 may maintain one or more ontologies 145, at least one of which may be used when generating a semantic flow graph 110 representing the program 120. For example, each ontology 145 may be written in Monocl or another ontology language suited for representing computer processes. Each ontology 145 may be associated with at least one subject-matter domain, which is a field to which the ontology applies. For example, and not by way of limitation, the ontology store 140 may include a data-science ontology, whose subject-matter domain is data science, and which describes statistics, machine learning, data processing, or a combination of these. Each ontology 145 may include concepts and corresponding annotations, and each concept and corresponding annotation is either a type or a function.

For instance, the table below illustrates concepts and an associated annotation of an example data-science ontology 145:

| | Concept | Annotation |
| --- | --- | --- |
| Type | data table | pandas data frame |
| Type | statistical model | scikit-learn estimator |
| Function | reading a tabular data file | read_csv function in pandas |
| Function | fitting a statistical model to data | fit method of scikit-learn estimators |

Each function annotation may map a concrete function onto a functions concept, also referred to as an abstract function. This disclosure refers to such a concrete function, for which a mapping exists in the ontology 145, as annotated in the ontology 145. For instance, if the below table is extracted from the data-science ontology 145, the concrete function read_csv is annotated in the data-science ontology 145 and is mapped to the abstract function of reading a tabular data file. Each type annotation may map a concrete type onto a type concept, also referred to as an abstract type. This disclosure refers to such a concrete type as annotated in the ontology 145. For instance, if the below table is extracted from the data-science ontology 145, the concrete type of a pandas data frame is annotated in the data-science ontology 145 and is mapped to the abstract type of a data table.

According to some embodiments of the invention, concepts formalize the abstract ideas of the subject-matter domain of an ontology 145. Concepts may constitute the basic types and basic functions from which more complex types and functions are constructed using the ontology language. Computer programs and other data analyses may be modeled as functions composed of the concepts of the applicable ontology 145.

According to some embodiments of the invention, it is assumed that software packages for data science, such as pandas and scikit-learn, instantiate concepts. Annotations describe how this instantiation occurs by mapping the types and functions defined by these software packages onto the types and functions of the ontology 145, specifically the data-science ontology 145 in this case. To avoid confusion between levels of abstraction, types of a software package are referred to herein as concrete types while types of an ontology 145 are referred to herein as abstract types. Analogously, functions of a software package are referred to herein as concrete functions while functions of an ontology 145 are referred to herein as abstract functions. Thus, a type annotation may map a concrete type (i.e., a primitive type or user-defined class in a programming language) onto an abstract type (i.e., a type concept in the ontology). Analogously, a function annotation may map a concrete function onto an abstract function. In some embodiments of the invention, in a broad sense, concrete functions include any programming language construct that does something, such as ordinary functions, methods of classes, attribute getters, attribute setters, and others. Modeling flexibility is useful to accurately translate diverse application programming interfaces software, such as statistical software, into a single set of universal concepts. Thus, in some embodiments of the invention, an annotation's abstract function is allowed to be an arbitrary Monocl program (i.e., any function expressible in the ontology language using the ontology's concepts).

As mentioned above, the enrichment system 100 may generate a raw flow graph 130 and then a semantic flow graph 110, where the semantic flow graph 110 is based on the raw flow graph 130 and on an applicable ontology 145. The raw flow graph 130 may be generated, such as by the graph generator 150, based on the program 120. Raw flow graphs 130 are known in the art, and thus one skilled in the art will understand how to build one. According to some embodiments of the invention, the raw flow graph 130 of the enrichment system 100 may be extracted from actual execution of the program 120. For instance, an execution of the program may be monitored, and actual data and function calls may be used to generate the raw flow graph 130. In other words, the enrichment system 100 may record an inter-procedural data flow of program execution into the raw flow graph 130.

The raw flow graph 130 may describe the execution of the program 120. Each box may be a concrete function or, more precisely, a function call observed during execution of the program 120. The wires of the raw flow graph 130 may be represent concrete types together with their observed elements. The observed elements may be either literal values assigned during the execution or object references assigned during the execution, depending on the type.

Figure 3A:
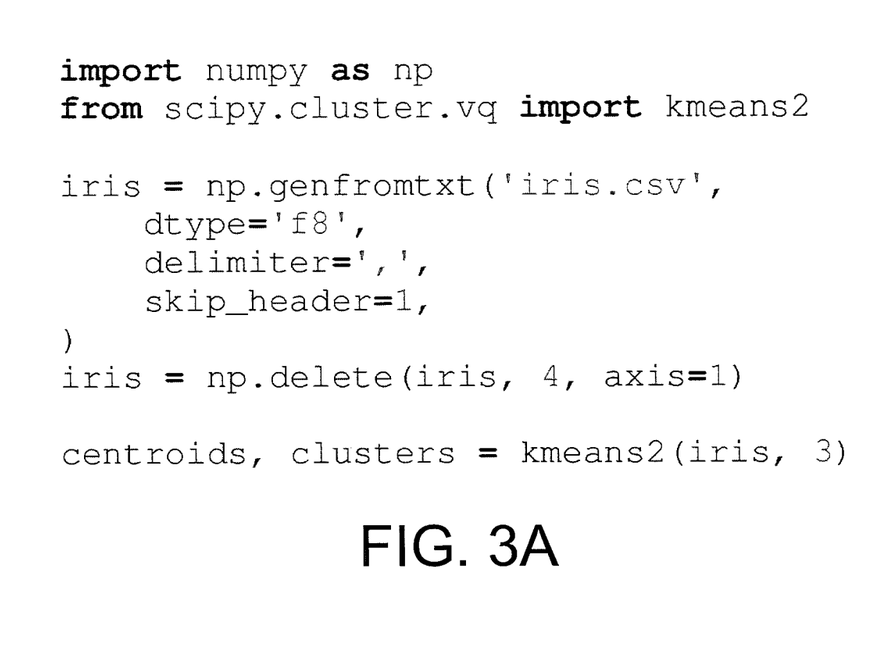
FIG. 3A illustrates a first example program.
Figure 3B:
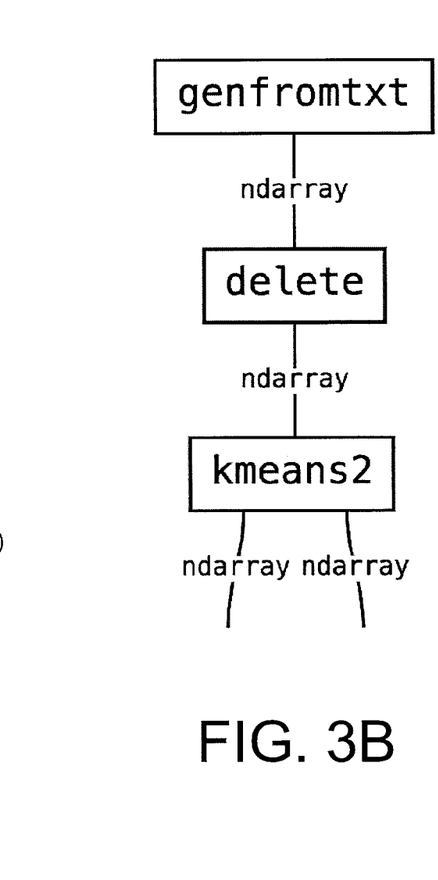
FIG. 3B illustrates a raw flow graph representing the first example program of FIG. 3A according to some embodiments of the invention.
Figure 4A:
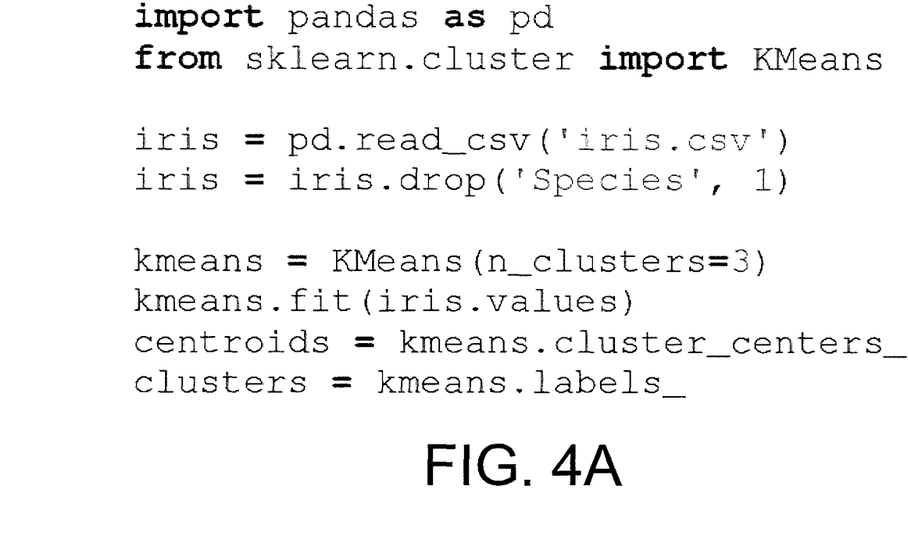
FIG. 4A illustrates a second example program.

FIGS. 3A-3B and FIGS. 4A-4B illustrate examples of computer programs 120 and the raw flow graphs 130 representing those programs 120, according to some embodiments of the invention. Each of FIG. 3A and FIG. 4A show the code of a respective computer program 120. Specifically, FIG. 3A is a program 120 for data analysis written in Python and utilizing the scientific computing packages NumPy and SciPy, while FIG. 4A is a program 120 for data analysis written in Python and utilizing the data science packages pandas and scikit-learn. The two programs 120 in FIG. 3A and FIG. 3B perform the same computation. They read the Iris dataset from a CSV file, drop the last column, fit a k-means clustering model with three clusters to the remaining columns, and return the cluster assignments and centroids.

Figure 4B:
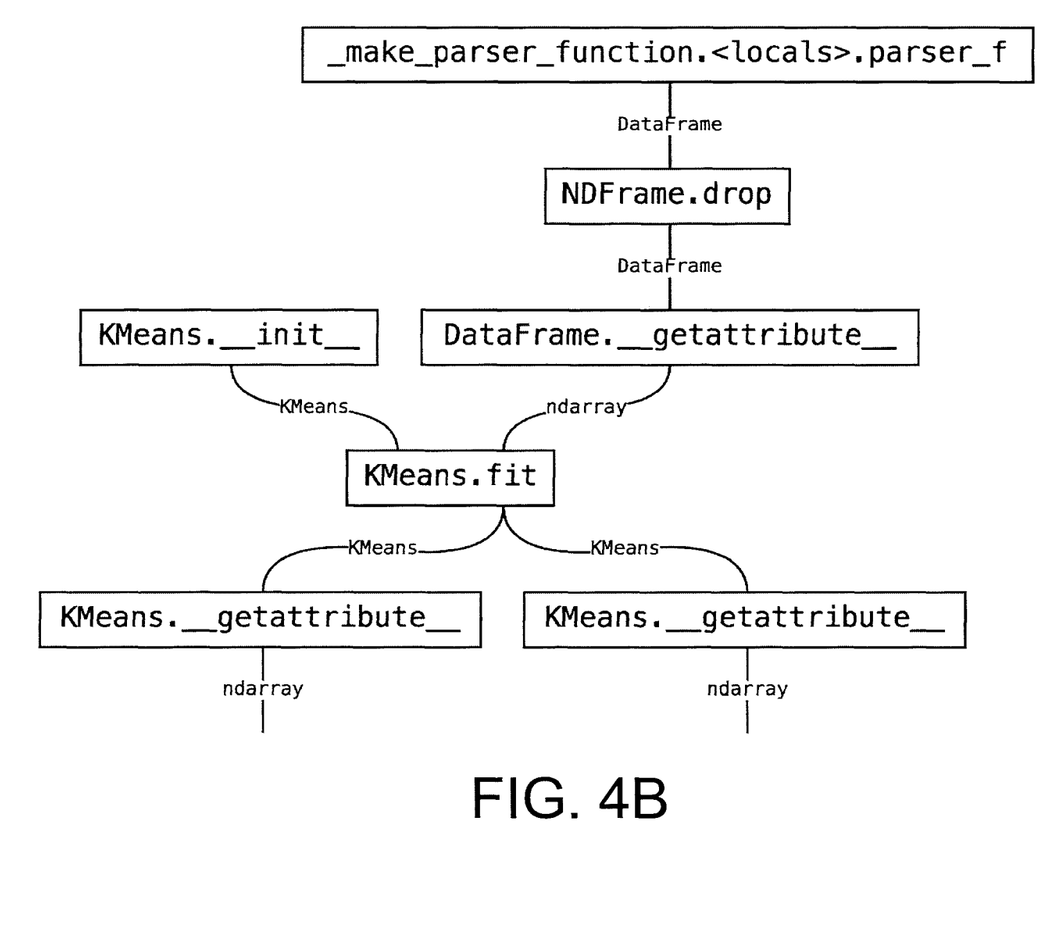
FIG. 4B illustrates a raw flow graph representing the second example program of FIG. 4A according to some embodiments of the invention.

FIG. 3B shows the raw flow graph 130 resulting from an execution of the program 120 in FIG. 3A, while FIG. 4B shows the raw flow graph 130 resulting from an execution of program 120 in FIG. 4A. Although the two programs 120 are syntactically distinct, they are semantically equivalent. As will be shown below, the enrichment system 100 may generate the same semantic flow graph 110 for these programs 120, even though the raw flow graphs 130 differ.

The semantic flow graph 110 may be generated, such as by the semantic enrichment engine 160, based on the raw flow graph 130 and based on an appropriate ontology. Both the raw flow graph 130 and the semantic flow graph 110 may be wiring diagrams having a set of interconnected objects, specifically boxes and wires. However, the raw flow graph 130 and the semantic flow graph 110 illustrate different levels of abstraction. In some embodiments of the invention, the semantic flow graph 110 describes the program 120 in terms of universal concepts, which are independent of the particular programming language and libraries used to implement the program 120. The boxes of the semantic flow graph 110 may represent abstract functions, or function concepts, and the wires may represent abstract types, or type concepts, and their respective observed elements. The semantic flow graph 110 may thus be viewed as an abstract function, composed of the concepts of the applicable ontology 145, written in the graphical syntax, and augmented with computed values.

Semantic enrichment may be used to transform the raw flow graph 130 into this semantic flow graph 110. Semantic enrichment may include two stages, an expansion stage and a contraction stage. In this disclosure, after semantic enrichment has begun, but before its completion, an intermediate flow graph may exist as the raw flow graph 130 is transformed into the semantic flow graph 110. In other words, the raw flow graph 130 is generated and, when semantic begins, transformed into an intermediate flow graph, which is then transformed in the semantic flow graph 110 as semantic enrichment completes.

In some embodiments of the invention, the expansion stage utilizes annotations of an ontology 145, which may be stored in the ontology store 140. Specifically, an appropriate ontology 145 may be used, where a particular ontology may be deemed appropriate if it describes the same subject-matter domain to which the program 120 applies. For instance, if the program 120 performs data analysis with a data science approach, then the data-science ontology 145 may be deemed appropriate.

In the expansion stage, annotated parts (e.g., boxes, wires) of the raw flow graph 130 may be replaced by their abstract definitions. For each box in the raw flow graph 130 referring to a concrete function, if that concrete function is annotated in the ontology, the concrete function is replaced by a corresponding abstract function. Specifically, the abstract function associated with the concrete function according to the ontology 145 may replace the concrete function. Analogously, each wire represents a concrete type, and for each wire for which an annotation is found for the concrete type in the ontology, the concrete type may be replaced by the corresponding abstract type. This stage of semantic enrichment is expansionary because, in some embodiments of the invention, a single box in the raw flow graph 130 can become an arbitrarily large sub-diagram in the semantic flow graph 110, depending on the annotations found in the ontology 145.

Thus, concrete types may be effectively annotated twice: explicitly by type annotations and implicitly by the domain and codomain types of function annotations. In some embodiments of the invention, functorality requires that these abstract types be compatible, ensuring the logical consistency of type and function annotations. Expansion may preserve the structure of the ontology language, including the use of compositions and products. Functorality may be a modeling decision that greatly simplifies the semantic enrichment, at the expense of imposing restrictions on how the raw flow graph 130 may be transformed.

In the real world, it is impractical to annotate every reusable unit (e.g., every type and function) of a subject-matter domain in an ontology 145. As such, it may be the case that not every concrete type or concrete function represented in the raw flow graph 130 is able to be replaced by a respective abstract type or abstract function. In other words, the semantics may be unknown for certain concrete types and concrete functions. Thus, these concrete types and functions need not be included in the semantic flow graph 110. However, simply deleting these concrete types and functions from the intermediate flow graph might alter the connectivity of the rest of the intermediate flow graph, which would be undesirable.

Thus, in the contraction stage, the unannotated parts of the intermediate flow graph, resulting from expanding the raw flow graph 130, may be simplified to the extent possible. Each reference to a concrete type or concrete function not annotated in the ontology may be removed, leaving behind unlabeled wires and boxes. Semantically, the unlabeled wires may be interpreted as arbitrary unknown types, and the unlabeled boxes may be interpreted as arbitrary unknown functions. In some cases, however, an unknown function may have a known domain, a known codomain, or both. In some embodiments of the invention, the intermediate flow graph is further simplified by collapsing unlabeled boxes. Specifically, every maximal connected sub-diagram of unlabeled boxes may be collapsed into a single unlabeled box. In determining the maximal connected sub-diagram of unlabeled boxes, it may be irrelevant whether wires for domains are codomains are labeled as abstract types. In other words, in some embodiments of the invention, the labeled and unlabeled states of boxes are considered, but the labeled and unlabeled states or wires are not, when collapsing a sub-diagram into an unlabeled box. The interpretation may be that a composition of unknown functions is just another unknown function. This stage is contractionary because, in some embodiments of the invention, it can only decrease the number of boxes in the semantic flow graph 110.

Returning to the prior examples in FIGS. 3A-3B and 4A-4B, semantic enrichment may be used to transform the raw flow graphs 130 of the two example programs 120 into the same semantic flow graph 110. As discussed above, these example programs 120 have different code but the same semantic meaning. Thus, it is desirable that they share a semantic flow graph 110, which can be achieved by the enrichment system 100, according to some embodiments of the invention.

Figure 5:
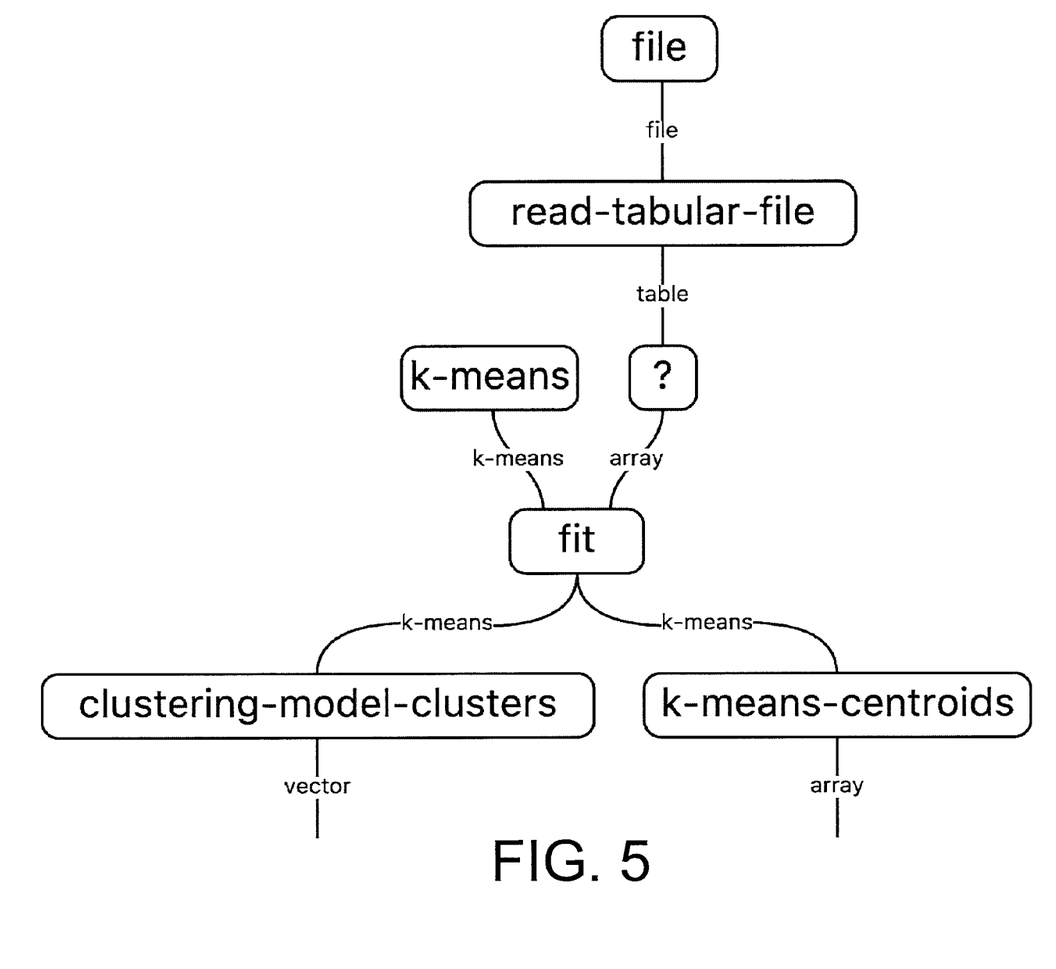
FIG. 5 is an example semantic flow graph representing both the first example program of FIG. 3A and the second example program of FIG. 4A according to some embodiments of the invention.

In the raw flow graph 130 of FIG. 3B, which represents the code of FIG. 3A, the kmeans2 function in SciPy is annotated in the ontology 145 (i.e., is recognized by the ontology 145). This function is expanded to an abstract function that creates a k-means clustering model, fits it to the data, and extracts its clusters and centroids. The abstract k-means clustering model does not correspond to any concrete object in the original program. However, the ontology 145 selected, specifically a data-science ontology 145, may recognize, by way of an included annotation in the ontology, that the function is semantically equivalent to the k-means clustering model. After the expansion stage, the only unannotated box is the NumPy delete function, and contracting this single box does not reduce the size of the wiring diagram. FIG. 5 illustrates an example semantic flow graph 110 resulting from this process and based on FIGS. 3A-3B, according to some embodiments of the invention.

In the raw flow graph 130 of FIG. 4B, which represents the code of FIG. 4A, the KMeans class in scikit-learn is also annotated in the ontology 145. This function is expanded to an abstract function that creates a k-means clustering model, fits it to the data, and extracts its clusters and centroids. The resulting intermediate flow graph is subjected to a contraction involving multiple boxes. Specifically, the sub-diagram having the pandas NDFrame.drop method composed with the values attribute access, via the special DataFrame.get-attribute method, is collapsed into a single unlabeled box. Once again, the resulting semantic flow graph 110 based on FIGS. 4A-4B appears in FIG. 5.

The resulting semantic flow graph 110 for the program 120 in FIG. 4A is the same as the result from the program 120 in FIG. 3A. Thus, in this example, the enrichment system 100 recognizes the semantic equivalence of the two programs 120 in FIGS. 3A and 4B, despite their syntactic differences.

Figure 6:
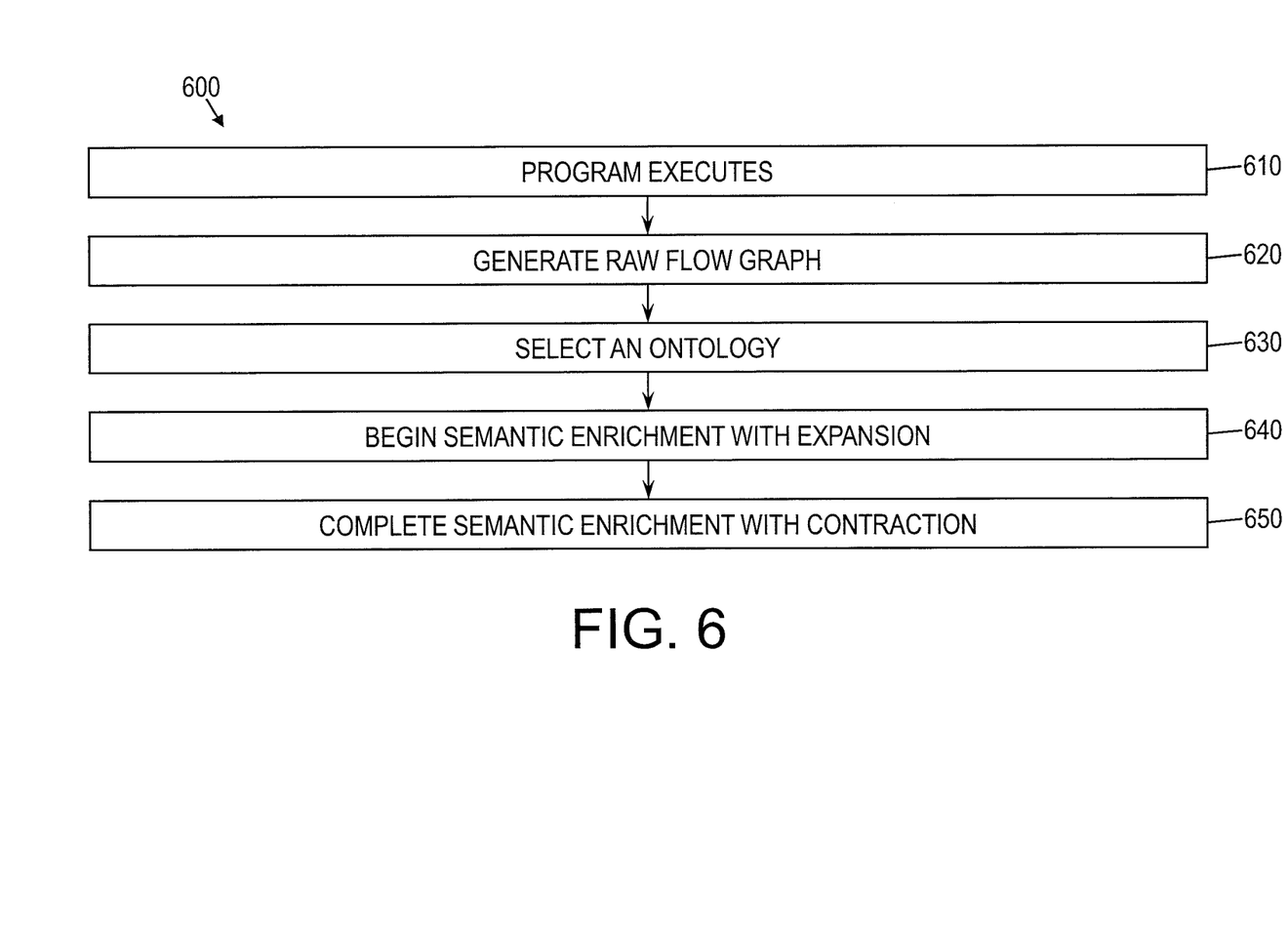
FIG. 6 is a flow diagram of a method for generating a semantic flow graph representing a program according to some embodiments of the invention.

In summary, FIG. 6 is a flow diagram of a method 600 for generating a semantic flow graph 110 from a program 120, according to some embodiments of the invention. As shown in FIG. 6, at block 610, execution of the program 120 begins. At block 620, a raw flow graph 130 may be generated based on execution of the program 120. In some embodiments of the invention, the raw flow graph 130 is built while the program is running, possibly in real time. Alternatively, the raw flow graph 130 may be built after execution ends, based on a log of the execution. At block 630, an ontology 145 is selected for use. In some embodiments of the invention, the user selects the ontology. Alternatively, however, the enrichment system 100 may compare the concrete functions and types observed during execution to the various ontologies 145 in the ontology store 140. The enrichment system 100 may then use the ontology 145 that annotates the greatest number of such concrete functions and types, or may use a combination of the ontologies 145 to ensure large coverage of the concrete functions and types. At block 640, semantic enrichment begins with the expansion stage, where concrete types and concrete functions are replaced with corresponding abstract types and abstract functions of the ontology 145. At block 650, semantic enrichment completes with contraction, in which unlabeled sub-diagrams are collapsed into individual unlabeled boxes. At block 660, the resulting semantic flow graph 110 is returned.

Teaching machines to comprehend code, as embodiments of the enrichment system 100 do, opens many intriguing possibilities. Embodiments of the invention may be used for various purposes and, in some cases, integrated into larger systems that utilize the resulting semantic flow graphs 110.

The enrichment system 100 may provide intelligent tooling for data science. For example, an integrated development environment (IDE) incorporating the enrichment system 100 may interact with a user at both the syntactic and semantic levels while the user works. For example, and not by way of limitation, by generating a semantic flow graph 110 and comparing it to other semantic flow graphs 110, the enrichment system 100 may recognize equivalent code and may make suggestions of other mechanisms for achieving the same task. For instance, if the user creates a logistic regression model using the glm function in R, the enrichment system 100 may recognize this logistic regression as a classification model by referring to an appropriate ontology 145. The enrichment system 100 may then suggest to the user a more flexible classification model, such as the logistic generalized additive model. The enrichment system 100 may then automatically generate code to invoke the gam function from the R package to implement the generalized additive model. Thus, the IDE integrating the enrichment system 100 may encourage the user to discover both new code and new concepts. For another example, the enrichment system 100 may automatically add comments to code or automatically generate metadata about code, describing that code semantically. In some embodiments of the invention, this may be achieved through natural language generation combined with a semantic flow graph 110, or combined with semantic representations in the appropriate ontology 145.

Figure 7:
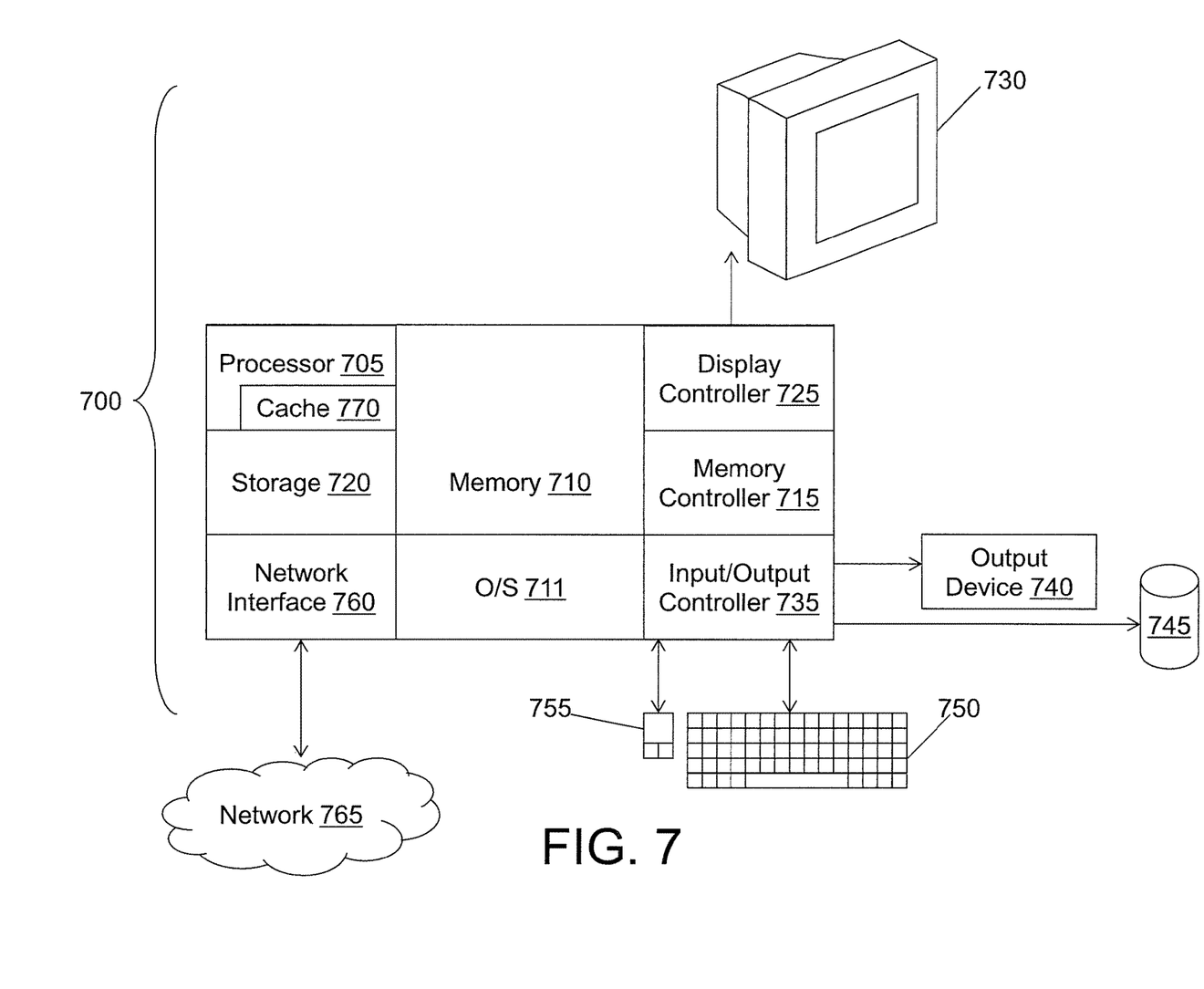
FIG. 7 is a block diagram of a computer system for implementing some or all aspects of the enrichment system according to some embodiments of the invention.

FIG. 7 is a block diagram of a computer system 700 for implementing some or all aspects of the system, according to some embodiments of this invention. The enrichment systems 100 and methods described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid-state drive. The stored instructions in memory 710 or in storage 720 may include those enabling the processor to execute one or more aspects of the enrichment systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Enrichment systems 100 and methods according to this disclosure may be embodied, in whole or in part, in computer program products or in computer systems 700, such as that illustrated in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating, using a processor, a raw flow graph based on execution of a program, the raw flow graph comprises a plurality of boxes and a plurality of wires; and
   generating a semantic flow graph based on the raw flow graph and based on an ontology in a subject matter-domain associated with the program, wherein the generating the semantic flow graph includes, for each box in the raw flow graph:
   identifying a respective concrete function represented by the box in the raw flow graph, wherein the respective concrete function is a function called during the execution of the program;

searching the ontology for the respective concrete function; and
based at least in part on determining that the respective concrete function is found in the ontology:
identifying a respective semantic concept corresponding to the respective concrete function according to the ontology; and
replacing the box in the raw flow graph with one or more objects representing the respective semantic concept,
wherein the semantic flow graph illustrates one or more semantic concepts of the program.

2. The computer-implemented method of claim 1 further comprising:
determining that the respective concrete function of a first box of the raw flow graph is not found in the ontology; and
collapsing the first box with one or more other boxes of the raw flow graph, responsive to the respective concrete function not being found in the ontology.

3. The computer-implemented method of claim 1, wherein:
the ontology annotates a plurality of concrete functions; and
the ontology maps each concrete function that is annotated to an abstract function that is a semantic concept.

4. The computer-implemented method of claim 1, wherein:
the ontology annotates a plurality of concrete types; and
the ontology maps each concrete type that is annotated to an abstract type that is a semantic concept.

5. The computer-implemented method of claim 1 further comprising selecting the ontology from a plurality of ontologies, wherein each of the plurality of ontologies is associated with a respective subject-matter domain.

6. The computer-implemented method of claim 1 further comprising:
generating, using the processor, a second raw flow graph based on execution of a second program;
generating a second semantic flow graph based on the second raw flow graph and based on the ontology, wherein the second semantic flow graph illustrates one or more semantic concepts of the second program;
comparing the second semantic flow graph to the semantic flow graph; and
determining that the second program is semantically equivalent to the program, based on the comparing the second semantic flow graph to the semantic flow graph.

7. A system comprising:
a memory having computer-readable instructions; and
one or more processors for executing the computer-readable instructions to cause the one or more processors to:
generate a raw flow graph based on execution of a program, the raw flow graph comprises a plurality of boxes and a plurality of wires; and
generate a semantic flow graph based on the raw flow graph and based on an ontology in a subject matter-domain associated with the program, wherein the generating the semantic flow graph includes, for each box in the raw flow graph:
identifying a respective concrete function represented by the box in the raw flow graph, wherein the respective concrete function is a function called during the execution of the program;
searching the ontology for the respective concrete function; and
based at least in part on determining that the respective concrete function is found in the ontology:
identifying a respective semantic concept corresponding to the respective concrete function according to the ontology; and
replacing the box in the raw flow graph with one or more objects representing the respective semantic concept,
wherein the semantic flow graph illustrates one or more semantic concepts of the program.

8. The system of claim 7, wherein the computer-readable instructions further cause the one or more processors to:
determine that the respective concrete function of a first box of the raw flow graph is not found in the ontology; and
collapse the first box with one or more other boxes of the raw flow graph, responsive to the respective concrete function not being found in the ontology.

9. The system of claim 7, wherein:
the ontology annotates a plurality of concrete functions; and
the ontology maps each concrete function that is annotated to an abstract function that is a semantic concept.

10. The system of claim 7, wherein:
the ontology annotates a plurality of concrete types; and
the ontology maps each concrete type that is annotated to an abstract type that is a semantic concept.

11. The system of claim 7, wherein the computer-readable instructions further cause the one or more processors to:
select the ontology from a plurality of ontologies, wherein each of the plurality of ontologies is associated with a respective subject-matter domain.

12. The system of claim 7, wherein the computer-readable instructions further cause the one or more processors to:
generate a second raw flow graph based on execution of a second program;
generate a second semantic flow graph based on the second raw flow graph and based on the ontology, wherein the second semantic flow graph illustrates one or more semantic concepts of the second program;
compare the second semantic flow graph to the semantic flow graph; and
determine that the second program is semantically equivalent to the program, based on the comparing the second semantic flow graph to the semantic flow graph.

13. A computer-program product for generating a semantic flow graph, the computer-program product comprising a computer-readable storage medium having program instructions embodied therewith, the program instructions executable by a processor to cause the processor to perform a method comprising:
generating a raw flow graph based on execution of a program, the raw flow graph comprises a plurality of boxes and a plurality of wires; and
generating a semantic flow graph based on the raw flow graph and based on an ontology in a subject matter-domain associated with the program, wherein the generating the semantic flow graph includes, for each box in the raw flow graph:
identifying a respective concrete function represented by the box in the raw flow graph, wherein the respective concrete function is a function called during the execution of the program;
searching the ontology for the respective concrete function; and
based at least in part on determining that the respective concrete function is found in the ontology:

identifying a respective semantic concept corresponding to the respective concrete function according to the ontology; and replacing the box in the raw flow graph with one or more objects representing the respective semantic concept, wherein the semantic flow graph illustrates one or more semantic concepts of the program.

14. The computer-program product of claim 13, the method further comprising:

determining that the respective concrete function of a first box of the raw flow graph is not found in the ontology; and collapsing the first box with one or more other boxes of the raw flow graph, responsive to the respective concrete function not being found in the ontology.

15. The computer-program product of claim 13, wherein:

the ontology annotates a plurality of concrete functions; and the ontology maps each concrete function that is annotated to an abstract function that is a semantic concept.

16. The computer-program product of claim 13, wherein:

the ontology annotates a plurality of concrete types; and the ontology maps each concrete type that is annotated to an abstract type that is a semantic concept.

17. The computer-program product of claim 13, the method further comprising selecting the ontology from a plurality of ontologies, wherein each of the plurality of ontologies is associated with a respective subject-matter domain.

* * * * *